(12) United States Patent
Ozaki

(10) Patent No.: US 9,848,097 B2
(45) Date of Patent: Dec. 19, 2017

(54) IMAGE READING DEVICE, IMAGE READING METHOD, IMAGE FORMING APPARATUS, AND COMPUTER-READABLE RECORDING MEDIUM

(71) Applicant: Tatsuya Ozaki, Kanagawa (JP)

(72) Inventor: Tatsuya Ozaki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 15/200,317

(22) Filed: Jul. 1, 2016

(65) Prior Publication Data

US 2017/0019547 A1    Jan. 19, 2017

(30) Foreign Application Priority Data

Jul. 13, 2015 (JP) ................................ 2015-139994

(51) Int. Cl.
*H04N 1/40* (2006.01)
*H04N 1/00* (2006.01)
*H04N 1/193* (2006.01)

(52) U.S. Cl.
CPC ......... *H04N 1/00708* (2013.01); *H04N 1/193* (2013.01); *H04N 1/40056* (2013.01); *H04N 2201/0081* (2013.01)

(58) Field of Classification Search
None
See application file for complete search history.

(56) References Cited

U.S. PATENT DOCUMENTS

| | | | | |
|---|---|---|---|---|
| 5,973,797 A * | 10/1999 | Tanaka | ............... | H04N 1/00681 358/449 |
| 6,788,438 B2 | 9/2004 | Takahashi et al. | | |
| 6,952,290 B2 * | 10/2005 | Ishido | ................ | H04N 1/00681 250/208.1 |
| 7,330,692 B2 * | 2/2008 | Kohchi | .................. | G03B 27/62 358/449 |
| 7,548,353 B2 * | 6/2009 | Kakutani | ........... | H04N 1/00681 358/486 |
| 8,467,110 B2 * | 6/2013 | Tanaka | ............... | H04N 1/00708 358/474 |

(Continued)

FOREIGN PATENT DOCUMENTS

| | | |
|---|---|---|
| JP | H08-069215 | 3/1996 |
| JP | 2002-135534 | 5/2002 |

(Continued)

*Primary Examiner* — Dung Tran
(74) *Attorney, Agent, or Firm* — Oblon, McClelland, Maier & Neustadt, L.L.P.

(57) ABSTRACT

An image reading device includes a controller that performs control, when a document size is to be determined, so as to reduce a light amount irradiated by a light source more than that in a case of image reading; a period extending unit that extends, when the document size is to be determined, a period in which an image sensor performs photoelectric conversion in a main scanning direction longer than that in a case of image reading; an averaging unit that averages, when the document size is to be determined, results obtained when a plurality of predetermined pixels perform the photoelectric conversion; and a determining unit that determines the document size according to a result averaged by the averaging unit in a period extended by the period extending unit.

18 Claims, 20 Drawing Sheets

(56) References Cited

U.S. PATENT DOCUMENTS

| | | | |
|---|---|---|---|
| 8,861,047 B2* | 10/2014 | Ishido | H04N 1/00681 |
| | | | 358/449 |
| 9,473,655 B2* | 10/2016 | Matsui | H04N 1/00708 |
| 2006/0208157 A1* | 9/2006 | Michiie | H04N 1/00689 |
| | | | 250/208.1 |
| 2009/0109496 A1* | 4/2009 | Baba | H04N 1/00681 |
| | | | 358/449 |

FOREIGN PATENT DOCUMENTS

| | | | |
|---|---|---|---|
| JP | 2010-041427 | | 2/2010 |
| JP | 5087590 | | 9/2012 |
| JP | 2013085047 A | * | 5/2013 |

* cited by examiner

IMAGE READING DEVICE, IMAGE READING METHOD, IMAGE FORMING APPARATUS, AND COMPUTER-READABLE RECORDING MEDIUM

CROSS-REFERENCE TO RELATED APPLICATION

The present application claims priority under 35 U.S.C. §119 to Japanese Patent Application No. 2015-139994 filed in Japan on Jul. 13, 2015. The contents of which are incorporated herein by reference in their entirety.

BACKGROUND OF THE INVENTION

1. Field of the Invention

The present invention relates to an image reading device, an image reading method, an image forming apparatus, and a computer-readable recording medium.

2. Description of the Related Art

Some image reading devices are those provided with a function of determining the size of a document when a pressure plate provided in its upper portion is closed. Particularly, in a device whose image reading speed is fast, a light source needs to irradiate the document with a large amount of light, which may cause a user to feel glare when he/she determines the size of the document. In order to reduce the glare perceived by the user, a technology is known in which the light amount irradiated by the light source is reduced at the time of determining the size of the document.

Japanese Patent No. 5087590 discloses an image reading device that adjusts, when an image reading unit is in a standby mode, an operation clock so that a mask period as a stop period of the operation clock to an image sensor is prolonged longer than that in a normal operation mode of the image reading unit as compared with the operation clock in the normal operation mode of the image reading unit while maintaining the frequency of the operation clock to a reading control unit and the image sensor.

However, conventionally, there is a problem that reading a document at a high speed and reducing glare perceived by the user when determining a document size are not compatible.

In view of the conventional problem, there is a need to provide an image reading device, an image reading method, an image forming apparatus, and a computer-readable recording medium having a computer program capable of achieving a balance between reading a document at a high speed and reducing glare perceived by the user when determining a document size while preventing erroneous determination of the document size.

SUMMARY OF THE INVENTION

It is an object of the present invention to at least partially solve the problems in the conventional technology.

According to exemplary embodiments of the present invention, there is provided an image reading device configured to determine a document size and perform image reading according to a result obtained when an image sensor performs photoelectric conversion for each pixel on a reflected light of light with which a light source irradiates the document, comprising: a controller configured to perform control, when the document size is to be determined, so as to reduce a light amount irradiated by the light source more than that in a case of image reading; a period extending unit configured to extend, when the document size is to be determined, a period in which the image sensor performs photoelectric conversion in a main scanning direction longer than that in a case of image reading; an averaging unit configured to average, when the document size is to be determined, results obtained when a plurality of predetermined pixels perform photoelectric conversion on the reflected light; and a determining unit configured to determine the document size according to a result averaged by the averaging unit in a period extended by the period extending unit.

Exemplary embodiments of the present invention also provide an image reading method to determine a document size and perform image reading according to a result obtained when an image sensor performs photoelectric conversion for each pixel on a reflected light of light with which a light source irradiates the document, comprising: performing control, when the document size is to be determined, so as to reduce a light amount irradiated by the light source more than that in a case of image reading; extending, when the document size is to be determined, a period in which the image sensor performs photoelectric conversion in a main scanning direction longer than that in a case of image reading; averaging, when the document size is to be determined, results obtained when a plurality of predetermined pixels perform photoelectric conversion on the reflected light; and determining the document size according to a result averaged by the averaging in a period extended by the extending.

Exemplary embodiments of the present invention also provide an image forming apparatus comprising: the above-defined image reading device; and an image forming unit configured to form an image based on image data read by the image reading device.

Exemplary embodiments of the present invention also provide a non-transitory computer-readable recording medium that contains a computer program that causes a computer to execute an image reading method that determines a document size and performs image reading according to a result obtained when an image sensor performs photoelectric conversion for each pixel on a reflected light of light with which a light source irradiates the document, the image reading method comprising: performing control, when the document size is to be determined, so as to reduce a light amount irradiated by the light source more than that in a case of image reading; extending, when the document size is to be determined, a period in which the image sensor performs photoelectric conversion in a main scanning direction longer than that in a case of image reading; averaging, when the document size is to be determined, results obtained when a plurality of predetermined pixels perform photoelectric conversion on the reflected light; and determining the document size according to a result averaged by the averaging in a period extended by the extending.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DETAILED DESCRIPTION OF THE PREFERRED EMBODIMENTS

Figure 1:
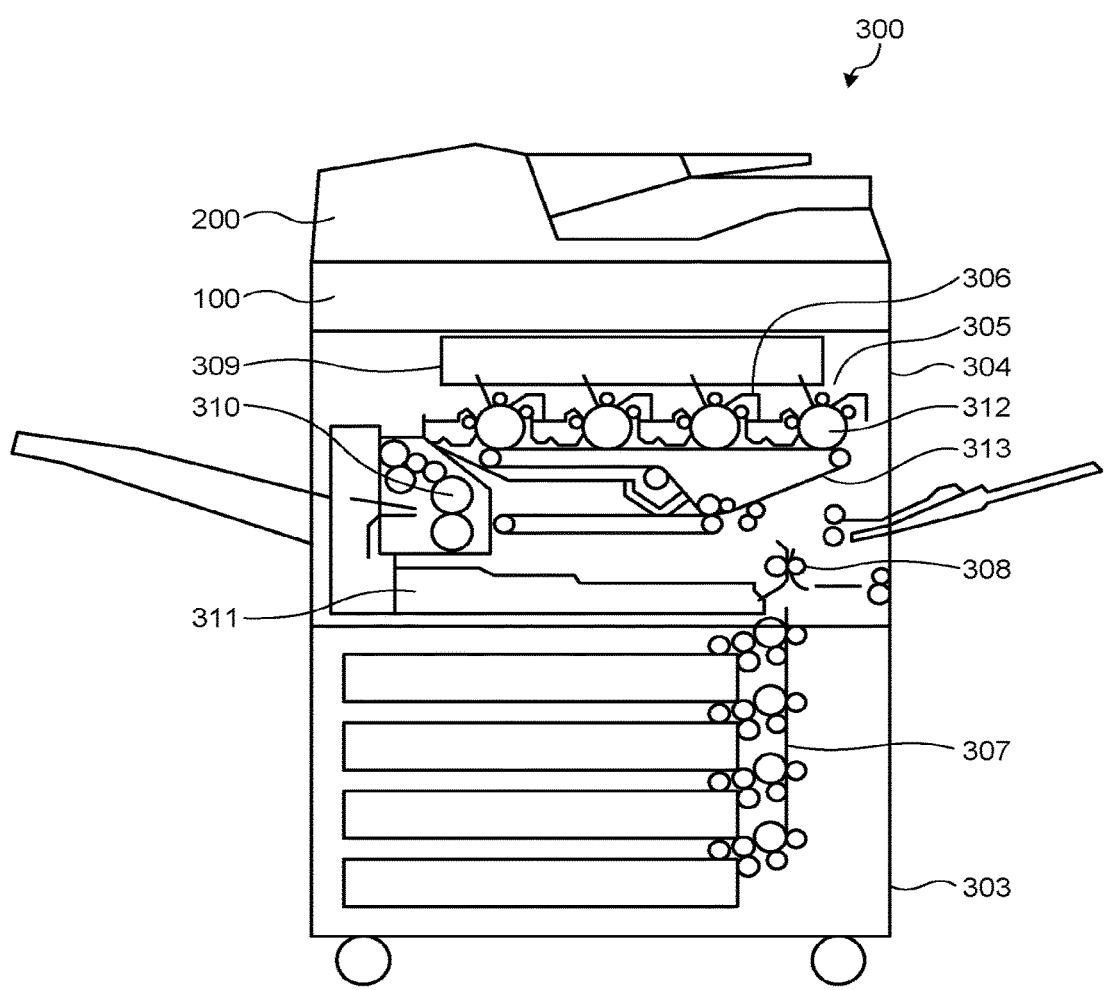
FIG. 1 is a configuration diagram illustrating a configuration example of an image forming apparatus according to some embodiments of the present invention.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An image forming apparatus according to some embodiments will be explained below with reference to the accompanying drawings. FIG. 1 is a configuration diagram illustrating a configuration example of an image forming apparatus 300 according to the embodiments. The image forming apparatus 300 is a digital copier that includes a paper feeding unit 303 and an image forming apparatus body 304 and is provided with an image reading device 100 and an automatic document feeder (ADF) 200 on its upper portion.

The image forming apparatus body 304 has an imaging unit (image forming unit) 305 of tandem system, a registration roller 308 that conveys recording paper supplied from the paper feeding unit 303 via a conveying path 307 to the imaging unit 305, an optical writing device 309, a fixing-conveying unit 310, and a double-sided tray 311, which are provided inside thereof.

Four photoconductor drums 312 are arranged in parallel to each other, corresponding to toners of four colors of Y, M, C, and K respectively, in the imaging unit 305. Arranged around each of the photoconductor drums 312 are image forming elements that include a charger, a developing device 306, a transfer device, a cleaner, and a static eliminator.

An intermediate transfer belt 313 stretched between a drive roller and a driven roller is arranged between the transfer device and each of the photoconductor drums 312 in a state of being sandwiched at each nip between the two.

The image forming apparatus 300 of the tandem system configured in this manner performs optical writing to the photoconductor drum 312 corresponding to each color, for each color of Y, M, C, and K, develops an image for each color toner using the developing device 306, and performs primary transfer of developed images on the intermediate transfer belt 313 in the order of, for example, Y, M, C, and K.

The image forming apparatus 300 forms a full-color image on the recording paper by performing secondary transfer of the full-color image, in which the four colors are superimposed by the primary transfer, to the recording paper, then fixing the full-color image on the recording paper, and ejecting it. The image forming apparatus 300 forms an image read by the image reading device 100 on the recording paper.

Figure 2:
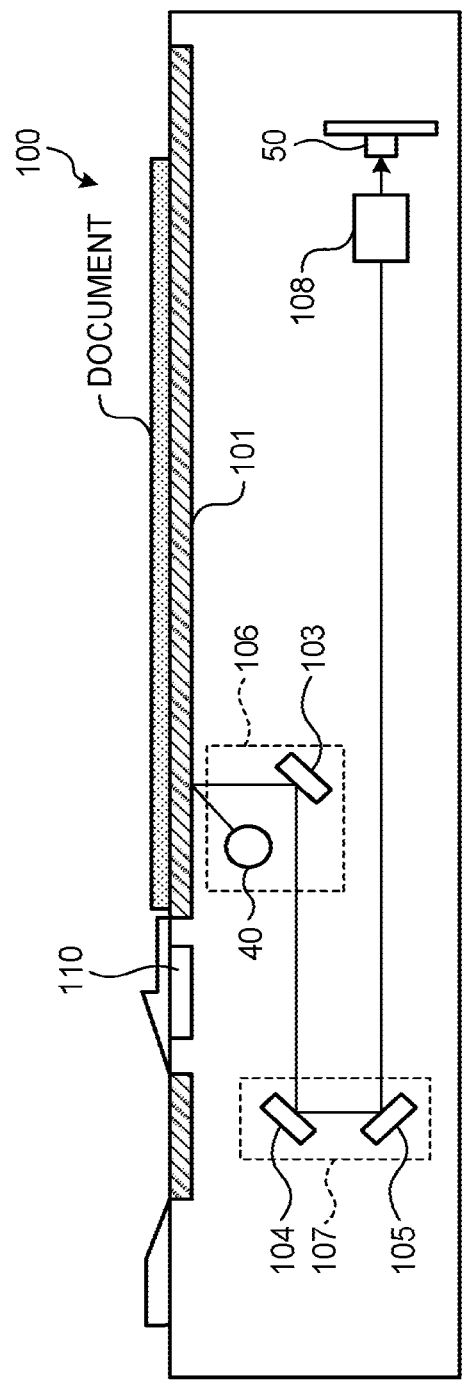
FIG. 2 is a configuration diagram illustrating a configuration example of an image reading device according to an embodiment of the present invention.

FIG. 2 is a configuration diagram illustrating a configuration example of the image reading device 100. The image reading device 100 is a scanner incorporated in an image forming apparatus such as a digital copier, a digital multifunction peripheral, and a facsimile device. The image reading device 100 may be a single scanner. The image reading device 100 illuminates a document being a subject (target to be read) with an illumination light emitted from the light source, preforms processing on a signal obtained by receiving a reflected light from the document using a complementary metal oxide semiconductor (CMOS) image sensor, and reads image data of the document.

Specifically, as illustrated in FIG. 2, the image reading device 100 includes a contact glass 101 where the document is placed, a first carriage 106 provided with a light source 40 for document exposure and a first reflecting mirror 103, and a second carriage 107 provided with a second reflecting mirror 104 and a third reflecting mirror 105. The image reading device 100 also includes an image sensor (CMOS image sensor) 50, a lens unit 108 for forming an image in the image sensor 50, and a reference white plate (white reference member) 110 used to correct various distortions due to a reading optical system or so.

In a scan mode in which the image reading device 100 scans an image side of the document and reads the image of the document, the first carriage 106 and the second carriage 107 scan the document in a sub scanning direction using a stepping motor. At this time, in order to maintain constant an optical path length from the contact glass 101 to the image sensor 50, the second carriage 107 moves at half the speed of the first carriage 106.

At the same time, the image side which is a lower side of the document set on the contact glass 101 is illuminated (exposed) by the light source 40 of the first carriage 106. An image of the reflected light from the image side is sequentially transmitted to the image sensor 50 via the first reflecting mirror 103 of the first carriage 106, the second reflecting mirror 104 and the third reflecting mirror 105 of the second carriage 107, and via the lens unit 108, and the image is formed therein.

The signal is output by photoelectric conversion of the image sensor 50 and the output signal is converted to a digital signal. Thus, the image of the document is read and digital image data is obtained.

Figure 3:
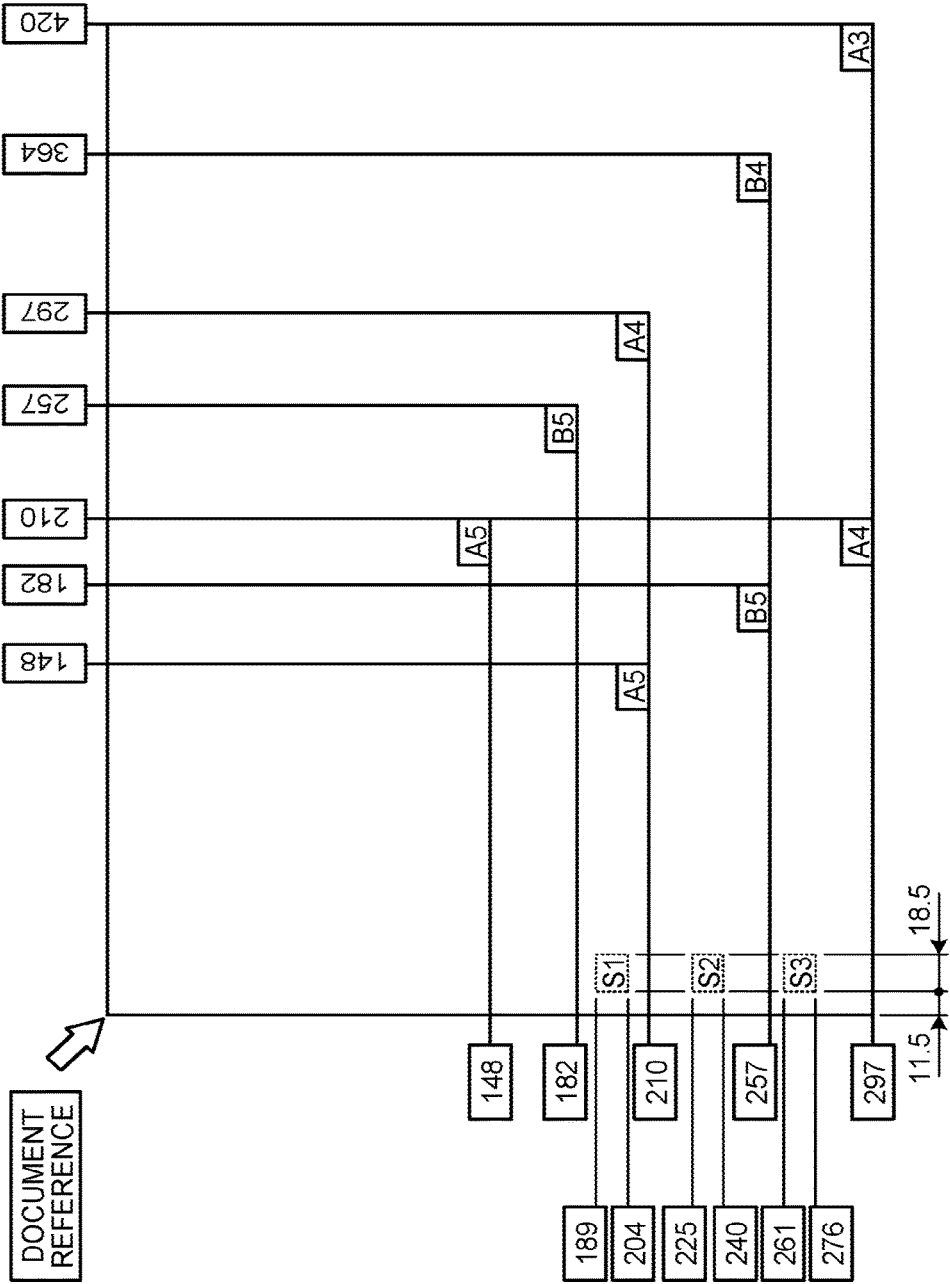
FIG. 3 is a diagram illustrating a positional relationship between a document detection position and a document size.

Determination of a document size (detection of a document size) performed by the image reading device 100 will be explained next. FIG. 3 is a diagram illustrating a positional relationship between a document detection position (spot) and a document size in the image reading device 100. As illustrated in FIG. 3, in the image reading device 100, spots S1 to S3 as document detection positions are set in a plurality of locations below the contact glass 101 in association with standard document sizes. The image reading device 100 detects the presence or absence of the document placed according to a left edge and a document reference at an inner side of the contact glass 101 at the spots S1 to S3 in a main scanning direction, and detects the presence or absence of the document using other spots in the sub scanning direction.

The image reading device 100 uses the light source 40 and the image sensor 50 with respect to the main scanning direction of the document to detect the presence or absence of the document at each of the spots S1 to S3 depending on whether pixels in the image sensor 50 react to the reflected light from the document irradiated with the light from the light source 40, in other words, whether pixels of the image sensor 50 receive the reflected light.

Figure 4:
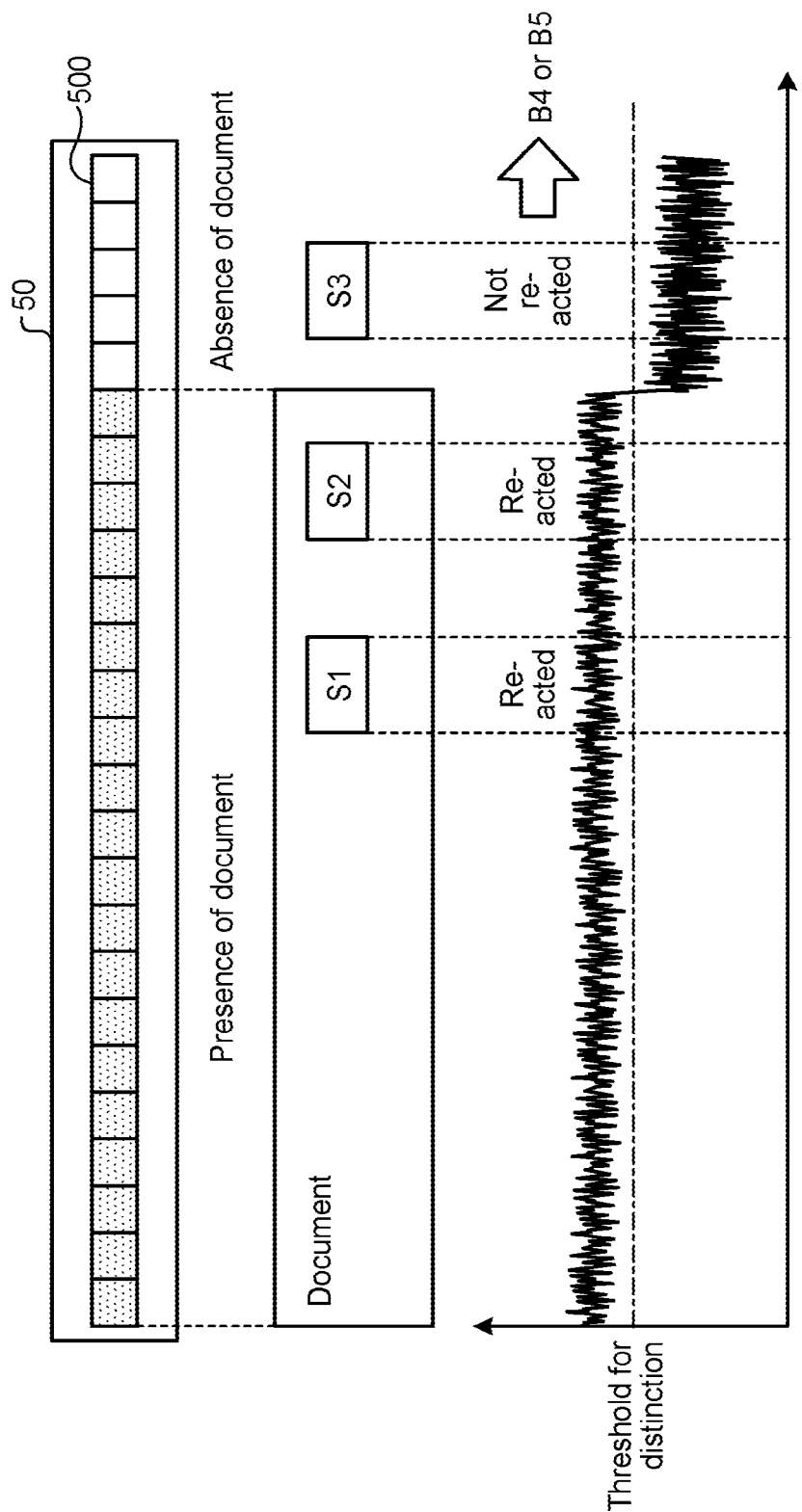
FIG. 4 is a diagram illustrating an example of an image signal output by an image sensor in order to determine the document size.

FIG. 4 is a diagram illustrating an example of an image signal output by the image sensor 50 in order to determine the document size. The image reading device 100 is configured that a determining unit 606, which is explained later, receives an image signal illustrated in FIG. 4 output from each pixel 500 inside the image sensor 50 and determines a document size (detects a document size). When receiving the image signal illustrated in FIG. 4, the determining unit 606 determines the document size based on the fact that the spots S1 and S2 react thereto but the spot S3 does not react thereto and based on the fact that the document is B4 set in landscape orientation or B5 set in portrait orientation.

Figure 5:
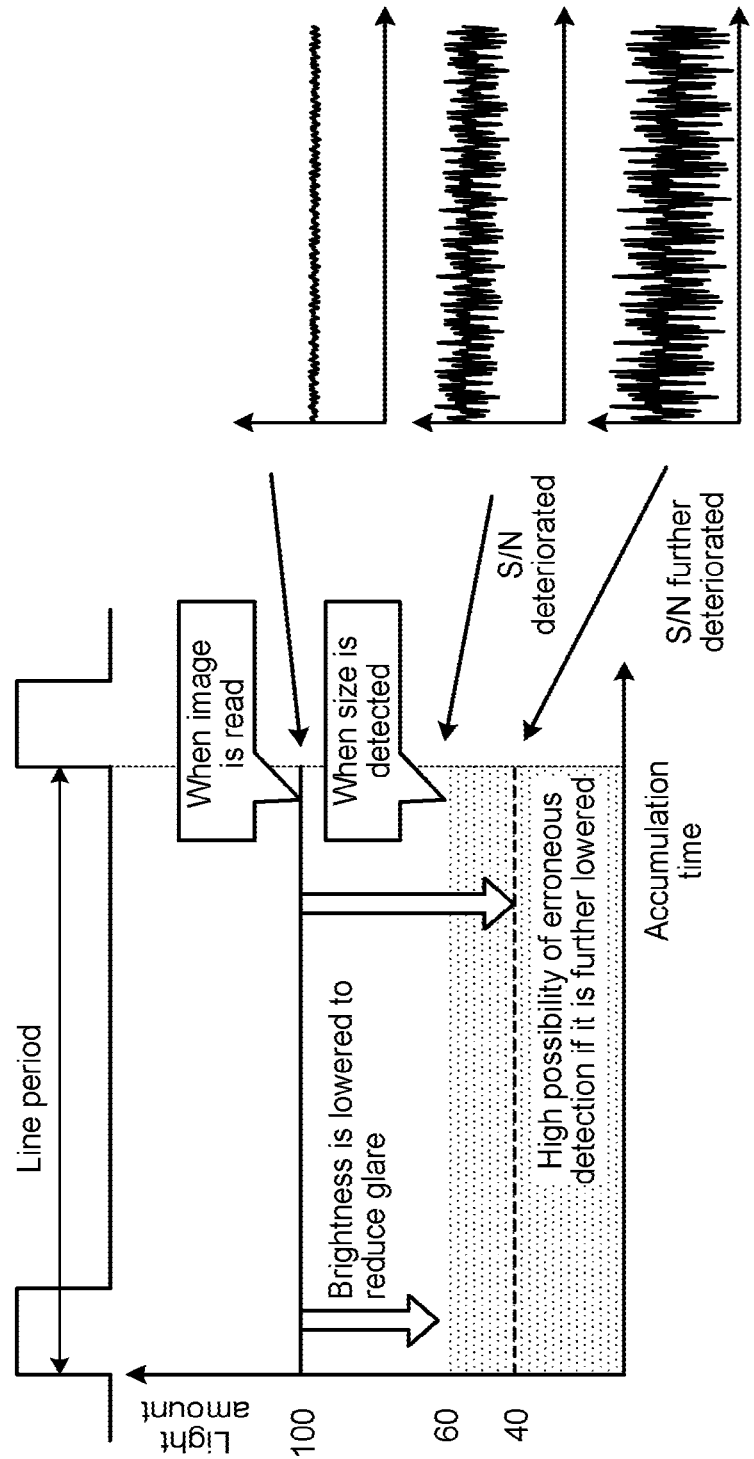
FIG. 5 is a diagram illustrating a relationship between a light amount and an image signal when the light amount of a light source is reduced to respond to the glare perceived by the user at the time of detecting the document size in an image reading device according to a comparative example.

FIG. 5 is a diagram illustrating a relationship between a light amount and an image signal when the light amount of the light source is reduced to respond to the glare perceived by the user at the time of detecting the document size in the image reading device according to the comparative example.

Figure 6:
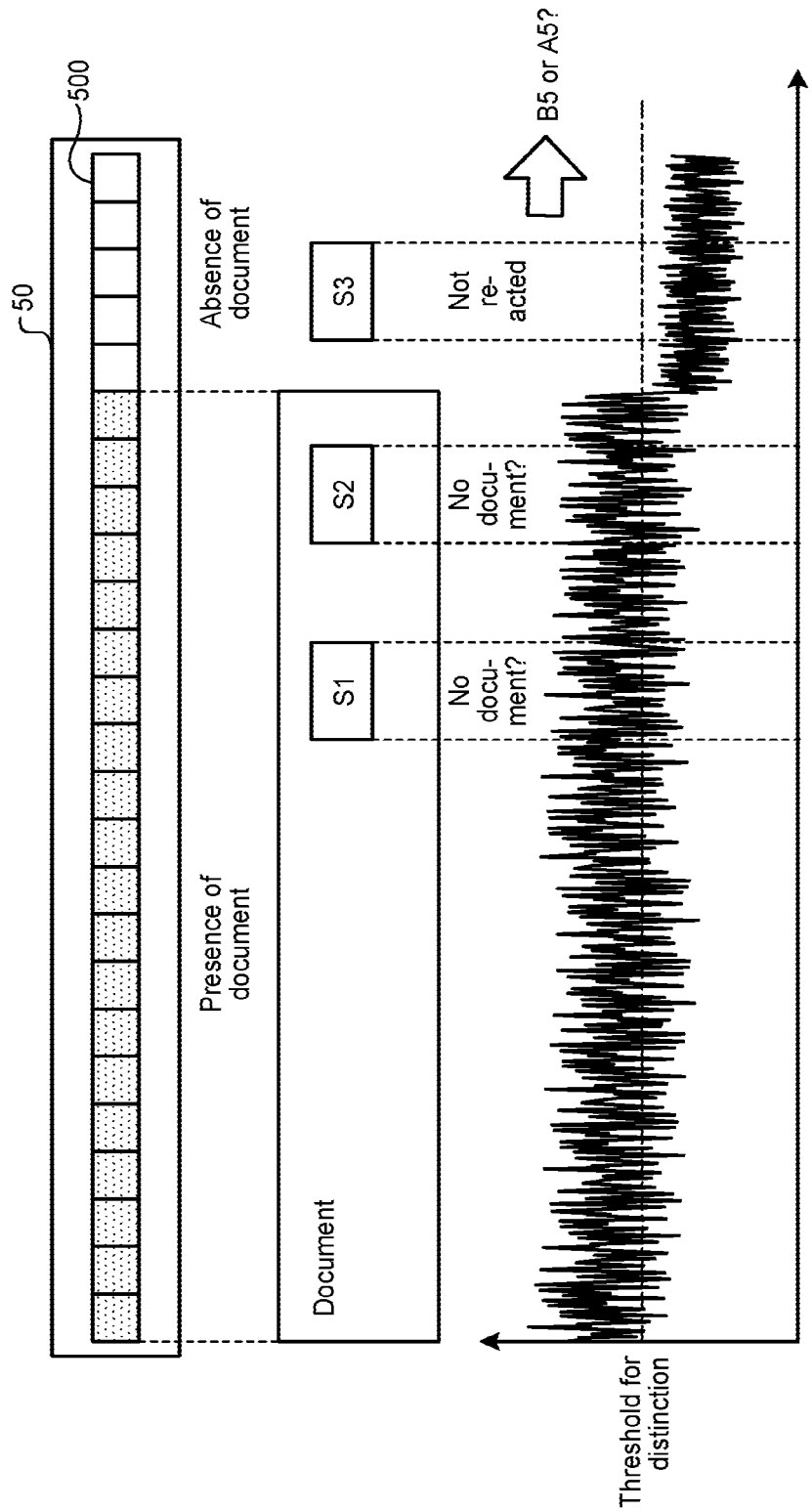
FIG. 6 is a diagram illustrating an example of an image signal output by an image sensor in order to determine the document size in the image reading device according to the comparative example.

FIG. 6 is a diagram illustrating an example of an image signal output by the image sensor in order to determine the document size in the image reading device according to the comparative example.

The conventional image reading device performs image reading using, for example, a reduction optical system, and generally uses an image sensor in which a pixel size is small. Therefore, a very large amount of light is required to ensure the quality of the read image. In addition, the conventional image reading device has a problem that, when the document size is to be detected, the large amount of light causes the user to feel glare. Conventionally, there is a particular problem with the image reading device of the reduction optical system using a CMOS image sensor that enables an image reading operation at a high speed and requires a large amount of light for the light source.

To reduce the glare perceived by the user, conventionally, as illustrated in, for example, FIG. 5, the light amount of the light source is reduced at the time of detecting the document size as compared with that at the time of the image reading. However, in this case, the total amount of light accumulated in the CMOS image sensor decreases, and if the light amount is lowered to some extent, a signal-to-noise ratio (S/N) is deteriorated as illustrated in FIG. 6, so that the possibility of erroneously detecting the document size is increased.

Figure 7:
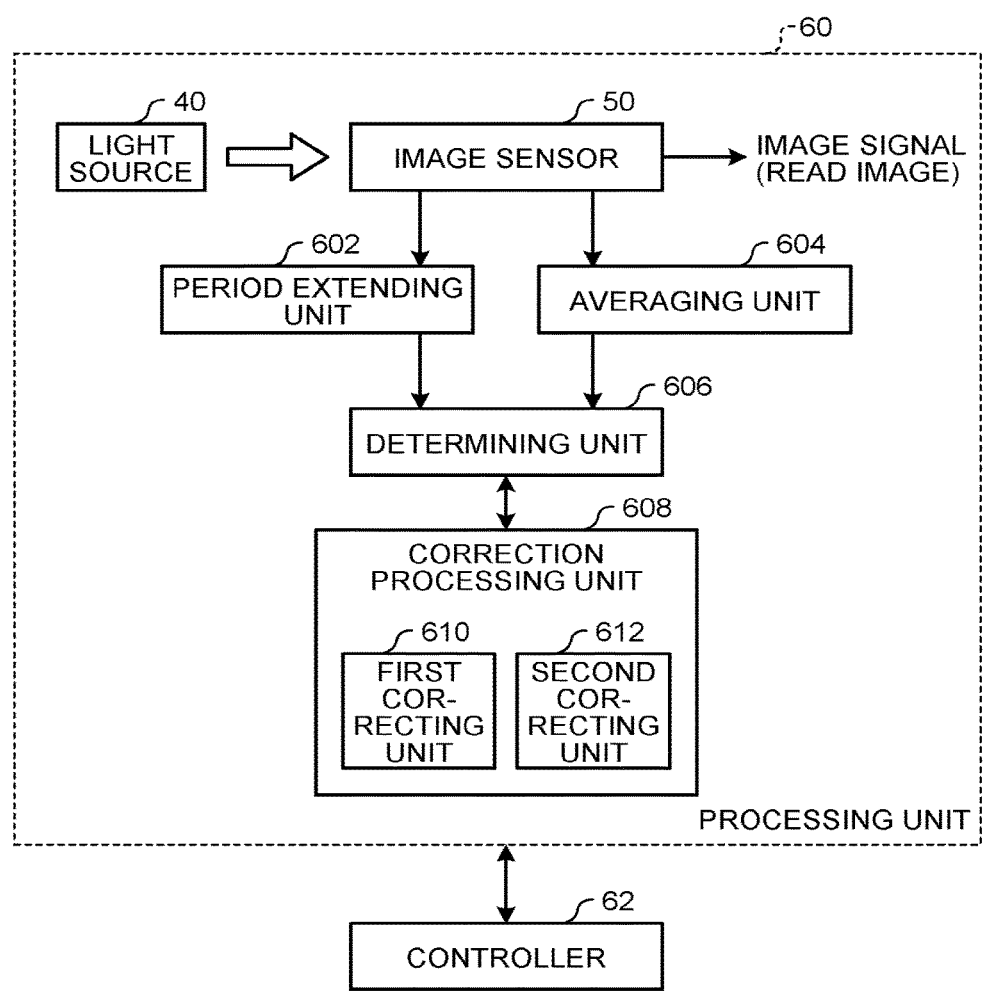
FIG. 7 is a block diagram illustrating functions included in the image reading device according to the embodiments in order to determine the document size.

FIG. 7 is a block diagram illustrating functions included in the image reading device 100 according to the embodiments in order to determine the document size. As illustrated in FIG. 7, the image reading device 100 includes a processing unit 60 that perform processing for determining a document size and a controller 62 that controls units constituting the processing unit 60.

For example, when the image reading device 100 determines the document size, the controller 62 controls so as to reduce the light amount irradiated by the light source 40 more than that in the case of document reading. The processing unit 60 includes the light source 40, the image sensor 50, a period extending unit 602, an averaging unit 604, the determining unit 606, and a correction processing unit 608. The light source 40 and the image sensor 50 are used in both cases when the document size is determined (at the time of detecting the document size) and when the document is read (at the time of image reading).

When the image reading device 100 determines the document size, the period extending unit 602 extends the period, in which the image sensor 50 performs photoelectric conversion in the main scanning direction, longer than that in the case of document reading. The period extending unit 602 extends the period in which the image sensor 50 performs photoelectric conversion so that the photoelectric conversion of the image sensor 50 is not saturated even if an ambient light of a preset light amount (assumed maximum light amount of an ambient light) is incident on the image sensor 50.

When the image reading device 100 determines the document size, the averaging unit 604 averages results obtained when a plurality of predetermined pixels 500 perform the photoelectric conversion. The averaging unit 604 may average the pixels 500 arranged in the main scanning direction, or may average results obtained when the pixels 500 perform photoelectric conversion on an area (patch) in which ranges are set in the main scanning direction and in the sub scanning direction respectively. The averaging unit 604 averages results obtained when the pixels 500 perform the photoelectric conversion based on the result obtained when a first correcting unit 610, explained later, performs black shading correction and the result obtained when a second correcting unit 612, explained later, performs white shading correction.

The determining unit 606 determines the document size depending on the result obtained when the averaging unit 604 averages the results in a period extended by the period extending unit 602. The correction processing unit 608 includes the first correcting unit 610 and the second correcting unit 612. The first correcting unit 610 uses black shading data when the image sensor 50 is under a dark condition to perform black shading correction. The second correcting unit 612 uses white shading data which is a result obtained when the image sensor 50 performs photoelectric conversion on the reflected light of the light with which the light source 40 irradiates the reference white plate 110 for each pixel to perform white shading correction.

The first correcting unit 610 uses the black shading data during the dark condition acquired before (e.g., right before) the determination of the document size to perform black shading correction. The first correcting unit 610 uses the black shading data during the dark condition acquired in a period extended by the period extending unit 602 to perform black shading correction. The second correcting unit 612 uses the white shading data acquired before (e.g., right before) the determination of the document size to perform white shading correction.

Figure 8:
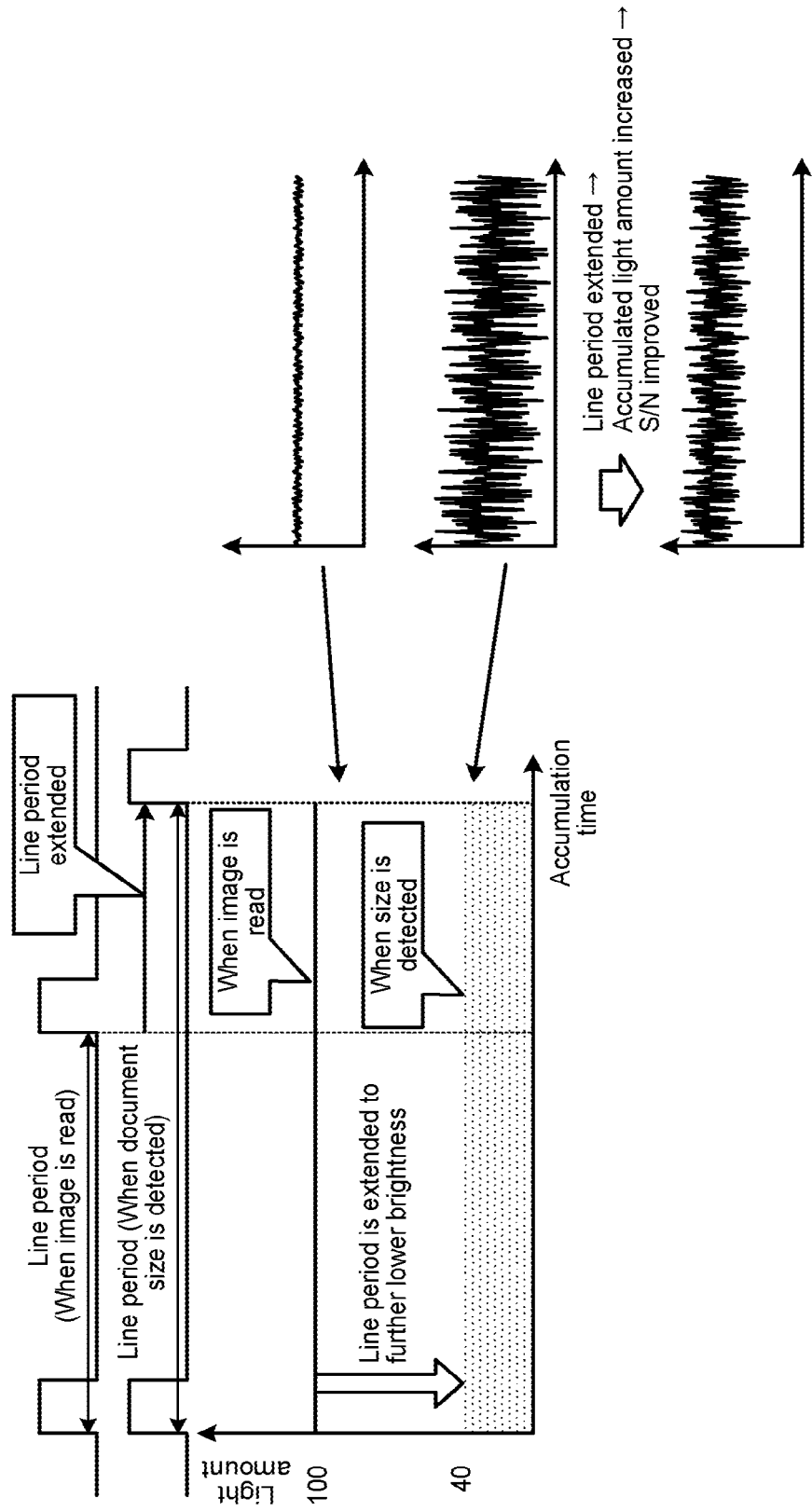
FIG. 8 is a diagram illustrating an operation example of a period extending unit.

The operations of the processing unit 60 and the controller 62 will be explained in more detail next with reference to the drawings. FIG. 8 is a diagram illustrating an operation example of the period extending unit 602. As illustrated in FIG. 8, when the light amount of the light source 40 is lowered at the time of detecting the document size as compared with the time of image reading, the period extending unit 602 extends a line period in the main scanning direction within a range in which the image sensor 50 is not saturated by accumulation of the ambient light. In other words, the image reading device 100 extends a light accumulation time at the time of detecting the document size, and thereby ensures the total amount of light accumulated in the image sensor 50, improves S/N, and prevents erroneous detection of the document size.

Figure 9:
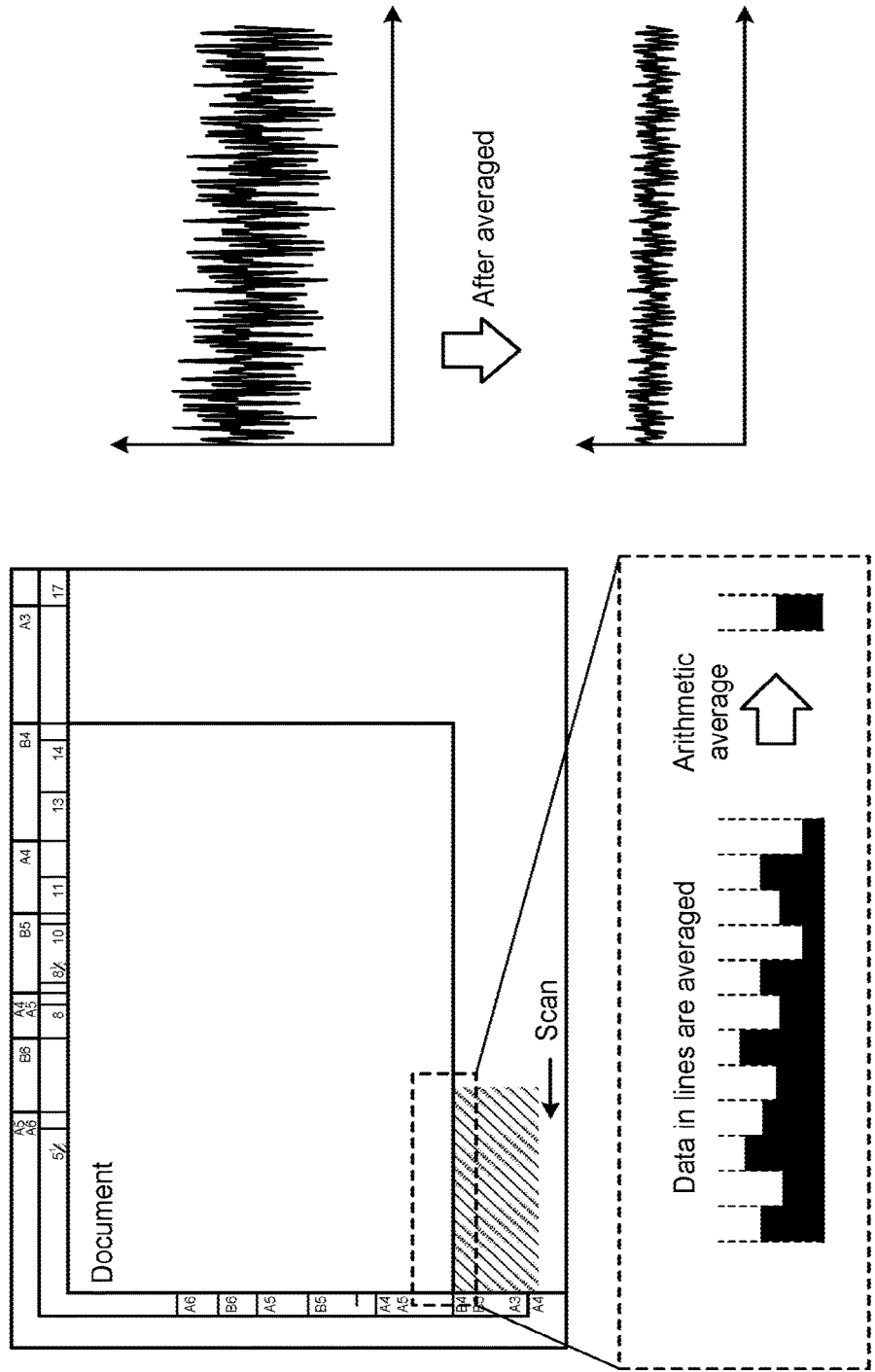
FIG. 9 is a diagram illustrating an operation example of an averaging unit.

FIG. 9 is a diagram illustrating an operation example of the averaging unit 604. As illustrated in FIG. 9, the averaging unit 604 averages a plurality of data that the image sensor 50 reads for each pixel at the time of detecting the document size, and thereby improves S/N. Thus, the image reading device 100 can further reduce the light amount of the light source 40 at the time of detecting the document size, and can therefore reduce the glare perceived by the user. Because the averaging unit 604 can improve S/N with an increase in the number of pixels used for averaging, it may be configured to increase the number of pixels (e.g., the number of lines) used for averaging according to the required S/N.

Figure 10:
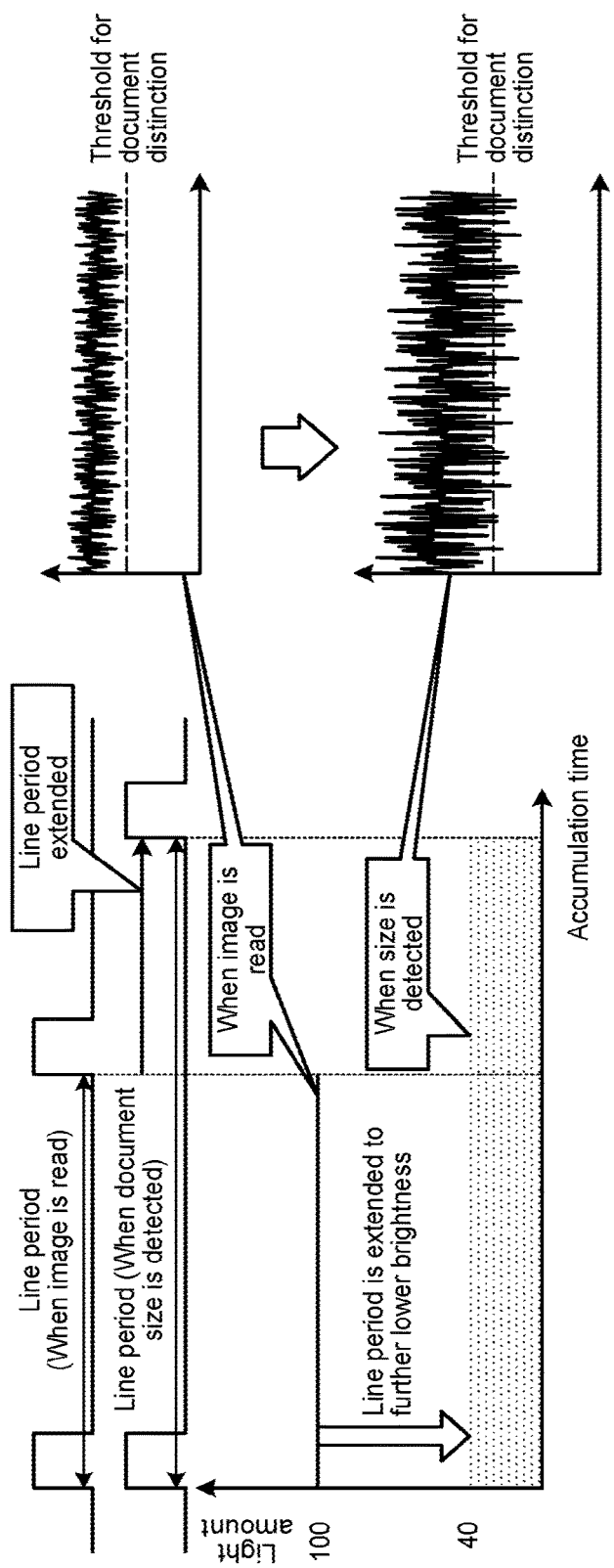
FIG. 10 is a diagram illustrating an operation of the image reading device when only the period extending unit is operated.
Figure 11:
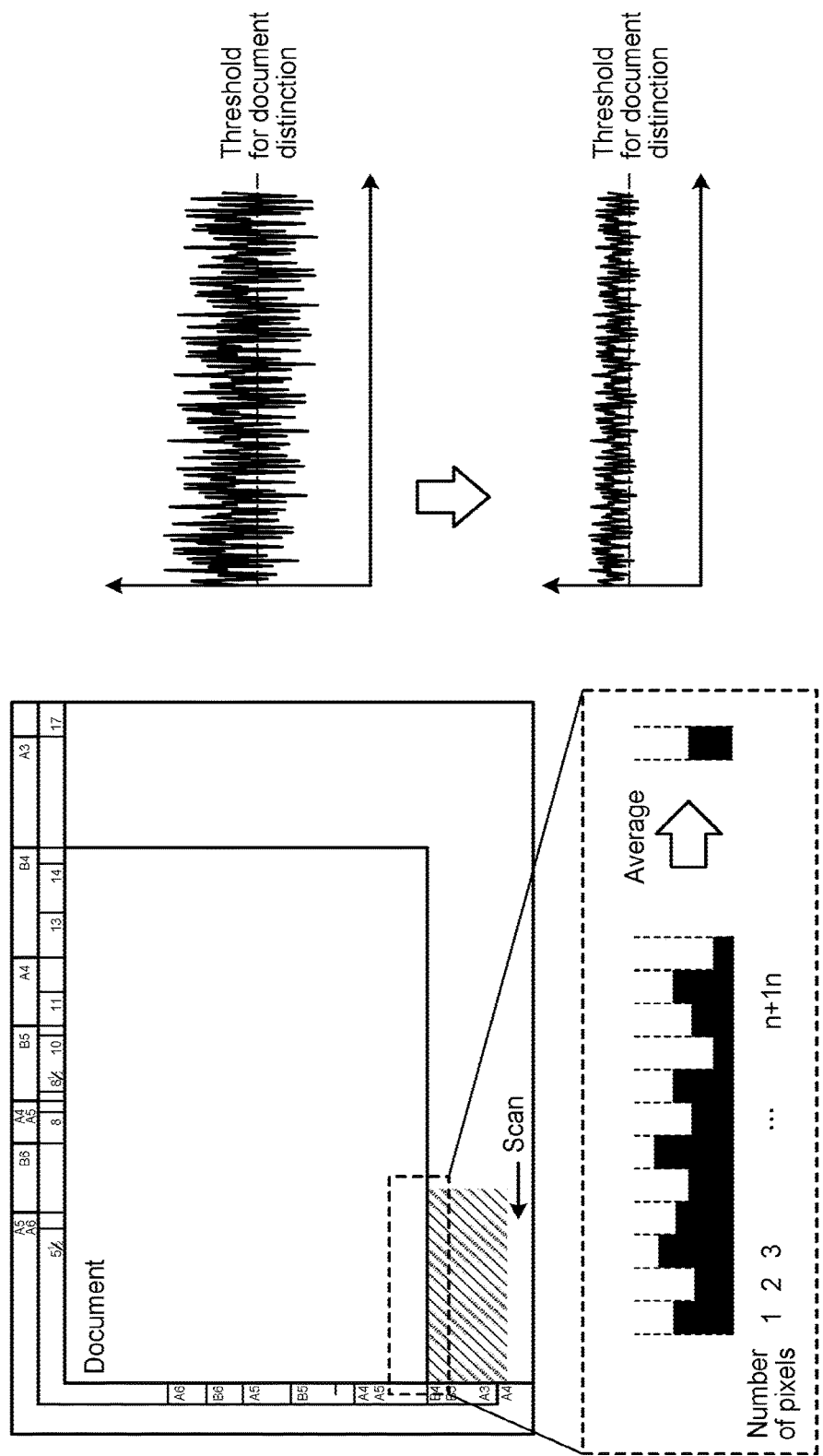
FIG. 11 is a diagram illustrating an operation of the image reading device when only the averaging unit is operated.

Advantageous effects derived from a case where the image reading device 100 includes both the period extending unit 602 and the averaging unit 604 will be explained next as compared with a case where the image reading device 100 does not include either one of the period extending unit 602 and the averaging unit 604. FIG. 10 is a diagram illustrating an operation of the image reading device 100 when only the period extending unit 602 is operated (without the averaging unit 604). FIG. 11 is a diagram illustrating an operation of the image reading device 100 when only the averaging unit 604 is operated (without the period extending unit 602).

As illustrated in FIG. 10, when only the period extending unit 602 is operated, even if the period extending unit 602 extends the line period so that the image sensor 50 is not saturated by accumulation of the ambient light, a proportion of the light amount of the ambient light to the light amount of the light source 40 may increase. In this case, the influence of shot noise becomes large, which may cause insufficient S/N.

As illustrated in FIG. 11, when only the averaging unit 604 is operated, even if the averaging unit 604 increases the number of image data to be averaged to improve S/N, the S/N that can be improved is limited according to the number of image data that the averaging unit 604 averages.

Thus, the image reading device 100 includes both the period extending unit 602 and the averaging unit 604, which enables reduction of the glare perceived by the user when the document size is determined while preventing erroneous determination of the document size.

Figure 12:
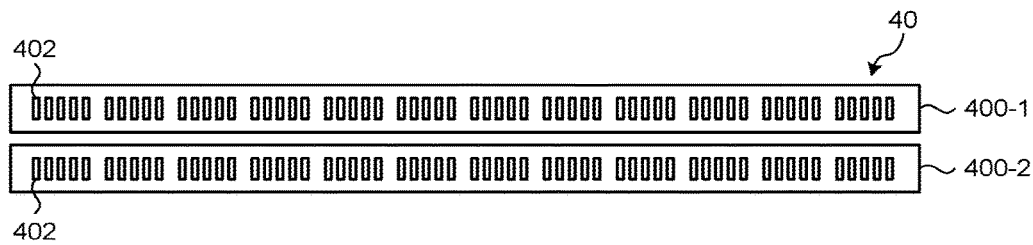
FIG. 12 is a diagram illustrating a configuration example of the light source.

The configuration example of the light source 40 and the glare perceived by the user will be explained next. FIG. 12 is a diagram illustrating a configuration example of the light source 40. The light source 40 includes, for example, two light source members 400-1 and 400-2. Each of the light source members 400-1 and 400-2 has a plurality of light emitting members (point light sources: blocks) 402 such as a plurality of light-emitting diodes (LEDs) arranged in the main scanning direction. The light emitting members 402 are configured so that lighting and extinguishment can be independently controlled respectively.

Figure 13:
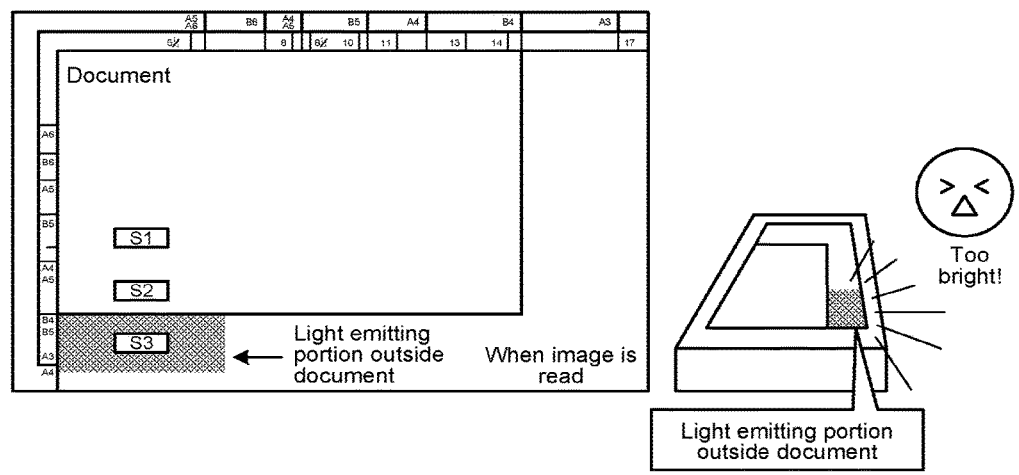
FIG. 13 is a diagram conceptually illustrating the glare perceived by the user when the light amount irradiated by the light source is large.

FIG. 13 is a diagram conceptually illustrating the glare perceived by the user when the light amount irradiated by the light source is large. When the pixel size of the image sensor 50 is made small and high-speed image reading is therefore possible, a very large amount of light which is enough to cover a short accumulation time of the light amount for the image sensor 50 is required for the light source 40. Moreover, when there is a limit on the number of point light sources that can be mounted on one light source member and the light amount per light source member is limited, a light amount required for high-speed image reading can be obtained by a plurality of light source members.

To accurately determine the document size, the image reading device 100 needs to distinguish between a spot where a document is supposed to be placed and a spot where no document is supposed to be placed. For example, as illustrated in FIG. 13, the image reading device 100 needs to light the light source 40 even for a portion not covered with the document of the contact glass 101. The reason that the user feels too bright at the time of detecting the document size is because the light source 40 emits light even to the portion not covered with the document and the light therefore reaches the user's eyes.

Figure 14A:
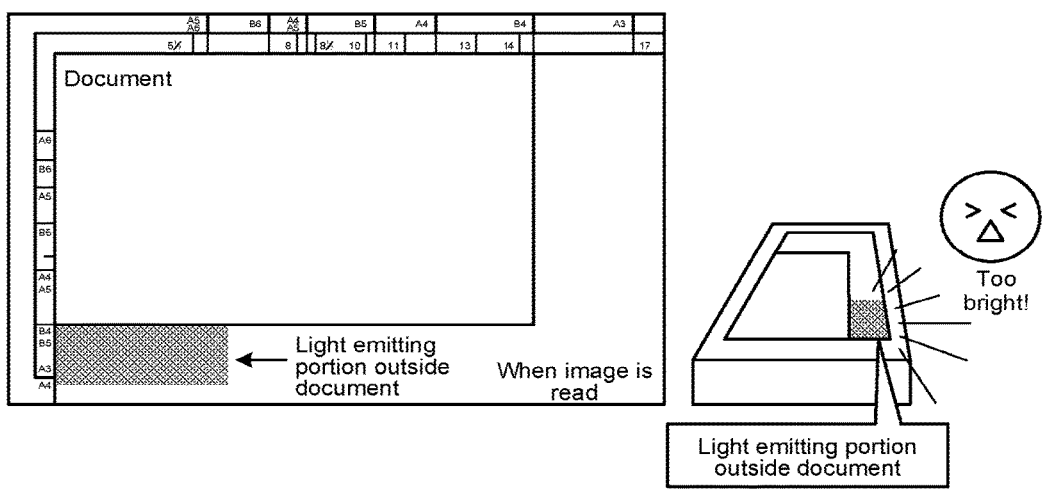
FIGS. 14A and 14B are diagrams illustrating reduction of the glare when the light source reduces the light amount.
Figure 14B:
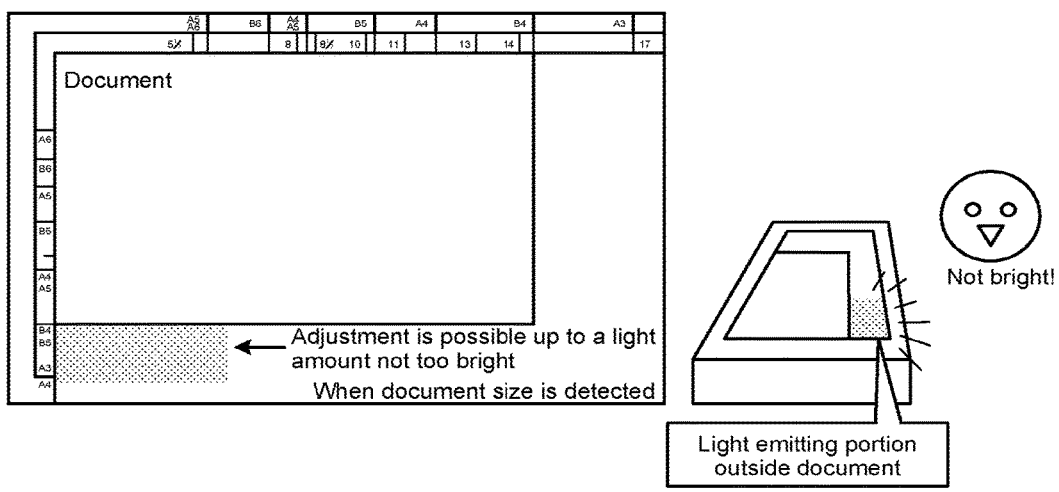

FIGS. 14A and 14B are diagrams illustrating reduction of the glare when the light source 40 reduces the light amount. FIG. 14A represents a case where the conventional image reading device detects the document size without reducing the light amount of the light source. FIG. 14B represents a case where the image reading device 100 according to the embodiments detects the document size by reducing the light amount of the light source 40. As illustrated in FIG. 14B, the image reading device 100 detects the document size by reducing the light amount of the light source 40 so that the user does not feel too bright.

Figure 15:
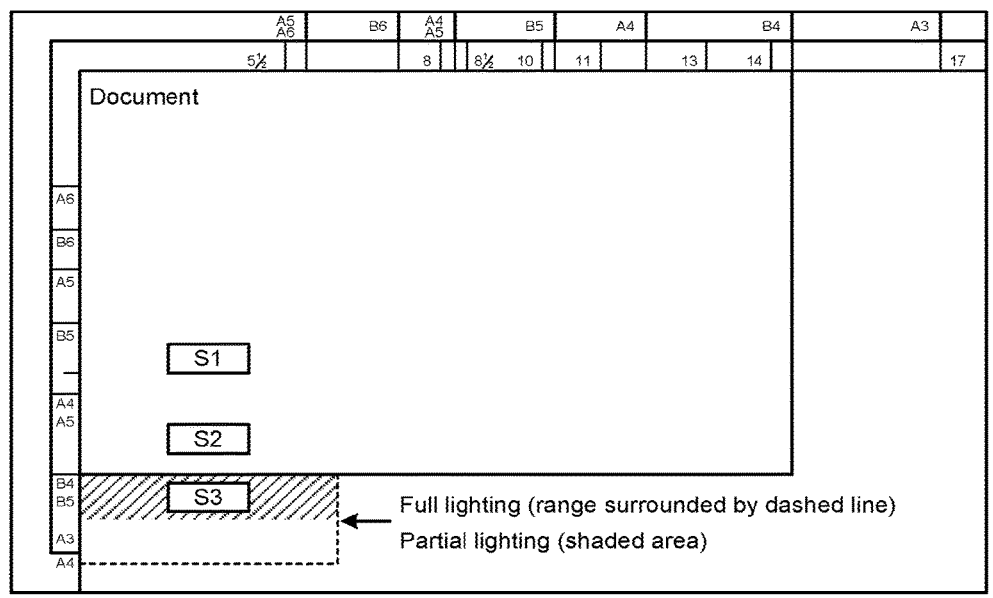
FIG. 15 is a diagram illustrating an emission range that reaches the user when the image reading device partially lights the light source.

FIG. 15 is a diagram illustrating an emission range that reaches the user when the image reading device 100 partially lights the light source 40. As illustrated in FIG. 15, in the image reading device 100, the controller 62 performs control so as not to light the light source 40 for the range (range not including the spots S1 to S3, or the like) unnecessary for detection of the document size (partial lighting). For example, the image reading device 100 only has to determine, for distinction between sizes in the main scanning direction of a document of B4 in landscape orientation, that there is the document at the positions of the spots S1 and S2 and that there is no document at the position of the spot S3, and thus information of an area outside the spot S3 is not needed. Therefore, the image reading device 100 can reduce the light amount reaching the user's eyes by extinguishing the light source for the area outside the spot S3.

Figure 16:
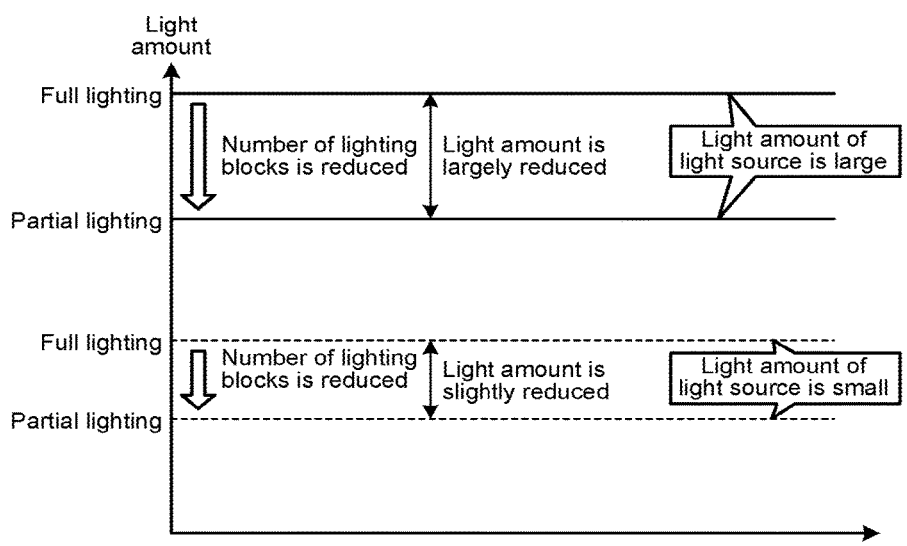
FIG. 16 is a diagram illustrating a change in the light amount due to partial lighting illustrated in FIG. 15.

FIG. 16 is a diagram illustrating a change in the light amount due to the partial lighting illustrated in FIG. 15. As illustrated in FIG. 15, when performing partial lighting such that the light source for an area unnecessary for the distinction between sizes in the main scanning direction at the time of detecting the document size is extinguished, the image reading device 100 can maintain the accuracy of document size detection even though the light amount reaching the user's eyes is further reduced. As illustrated in FIG. 16, the larger the light amount at the time of full lighting, the larger the reduced amount of the light amount becomes at the time of partially lighting the same number of blocks.

Figure 17:
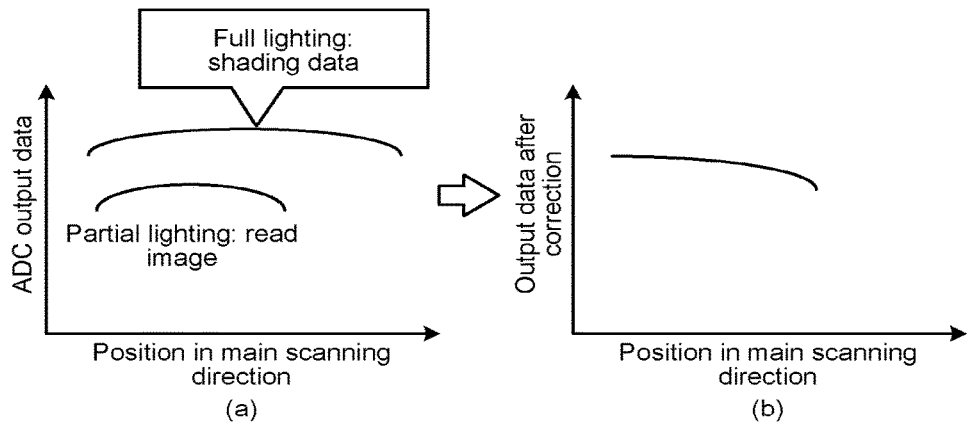
FIG. 17 is a diagram exemplifying shading correction performed when the image reading device according to the comparative example detects a document size.

Moreover, the shading correction is also effective to improve S/N in the determination of the document size. FIG. 17 is a diagram exemplifying shading correction performed when the image reading device according to the comparative example detects a document size. ADC output data mentioned here indicates data output by an analog-to-digital (A/D) converter that performs A/D conversion on the result output by the image sensor. For example, the image reading device corrects the non-uniformity of the sensitivity of the image sensor and of the light amount of the light source etc. and the unevenness of light amount in the main scanning direction due to decline of the light amount at the edge based on the cos 4 law of lens by previously acquiring the shading data and taking a ratio of a read image thereto.

The image reading device according to the comparative example illustrated in a section (a) of FIG. 17 performs correction using the shading data obtained by fully lighting the light source at the time of detecting the document size, and the uniformity of the light amount in the main scanning direction is different from that at the time of partial lighting. Therefore, as illustrated in a section (b) of FIG. 17, when the image reading device according to the comparative example uses the shading data at the time of full lighting to perform shading correction, optimal shading correction cannot be performed when the light source is partially lighted. The output data is declined especially after the correction of an edge of the document. When the document size is to be determined, because the image reading device determines the presence or absence of the document according to the data for the edge of the document, if the correction of the edge is not correctly performed, the accuracy of determination is worsened, which results in erroneous detection of the document size.

Figure 18:
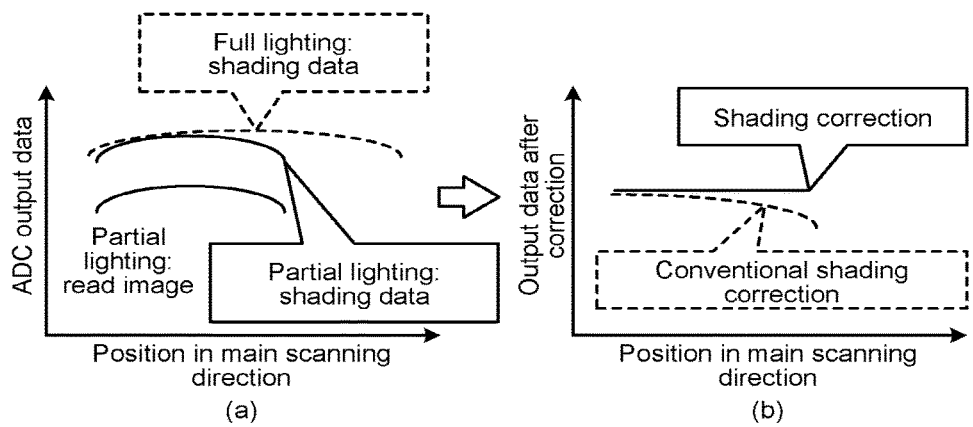
FIG. 18 is a diagram illustrating shading correction performed by using shading data acquired by partially lighting the light source.

FIG. 18 is a diagram illustrating shading correction performed by using shading data that the image reading device 100 according to the embodiments acquires by partially lighting the light source 40. The image reading device 100 reads the reference white plate 110 after the light source 40 is partially lighted and the image is read, and thereby acquires shading data in a state of partially lighting the light source 40 without delaying the operation of detecting the document size (see FIG. 19). The image reading device 100 performs white shading correction using the shading data based on the partial lighting of the light source 40, and thereby improve the accuracy of the determination of the document size, which enables erroneous detection of the document size to be prevented.

Figure 19:
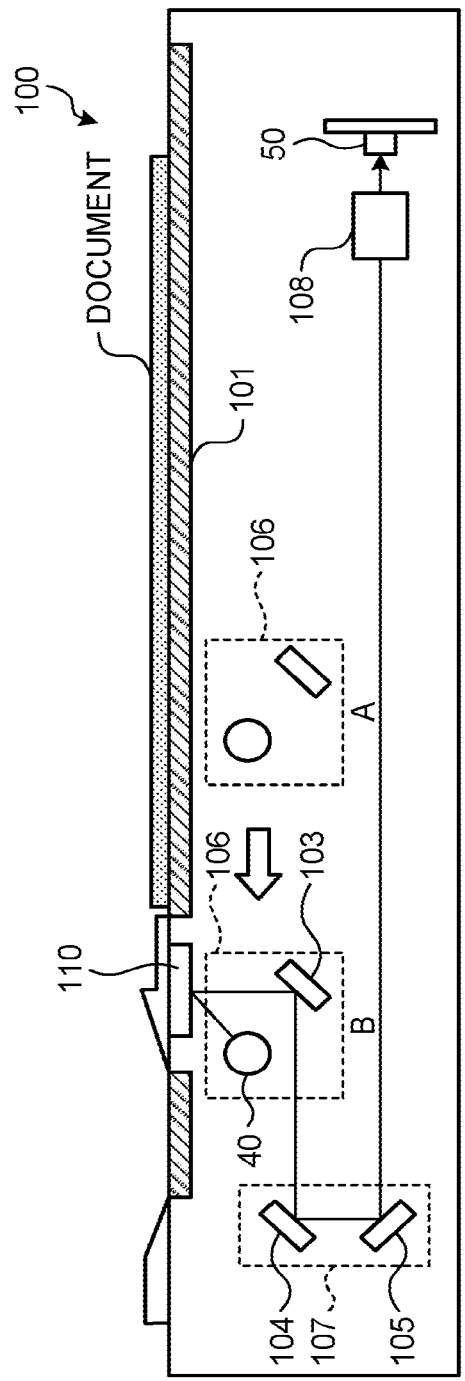
FIG. 19 is a diagram illustrating an acquisition position of white shading data when the image reading device determines a document size.

FIG. 19 is a diagram illustrating an acquisition position of white shading data when the image reading device 100 determines a document size. As illustrated in FIG. 19, when the document size is to be determined, the image reading device 100 reads a part of the document at a size detection position A or when the first carriage 106 moves from the size detection position A to a home position side (to the left side in FIG. 19), and determines the document size. The image reading device 100 then reads the reference white plate 110 when the first carriage 106 reaches a shading data acquisition position B, and acquires white shading data.

Therefore, because the image reading device 100 can acquire the white shading data having the same lighting range at substantially the same timing as the document reading for determination of the document size, highly accurate white shading correction is possible. Moreover, to correct fixed pattern noise of the image sensor 50, the image reading device 100 acquire black shading data when the first carriage 106 reaches below the reference white plate 110 where no ambient light enters.

Figure 20:
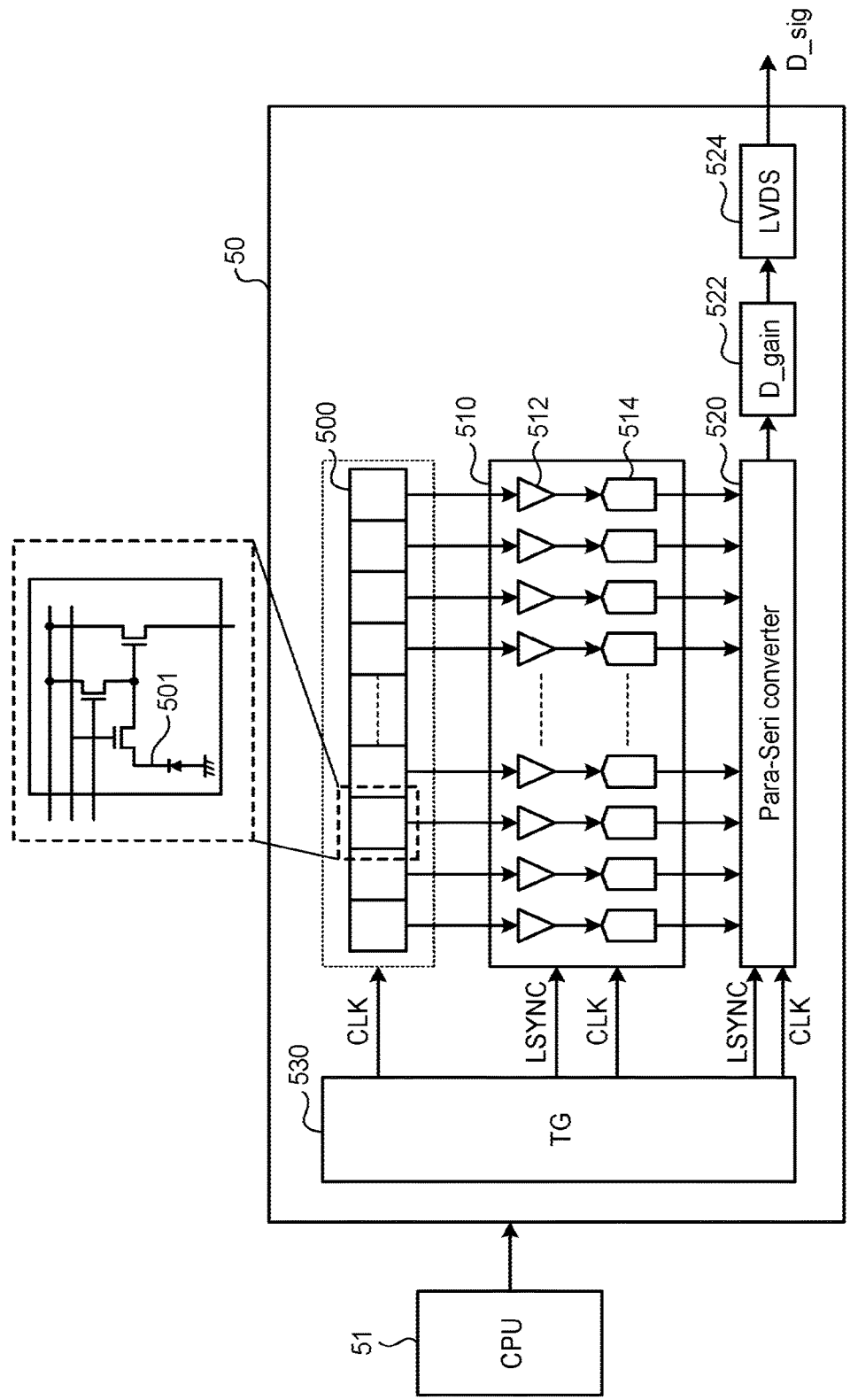
FIG. 20 is a diagram illustrating the configuration of the image sensor and its peripheral.

The image sensor 50 will be explained in more detail next. FIG. 20 is a diagram illustrating the configuration of the image sensor 50 and its peripheral. The image sensor 50 is a CMOS linear sensor that includes, for example, the pixels 500 arranged in the main scanning direction, an analog processor 510, a parallel-to-serial converter (Para-Seri converter) 520, a digital amplifier (D_gain) 522, low-voltage differential signaling (LVDS) 524, and a timing controller (TG) 530, and operates according to the control of a central processing unit (CPU) 51.

Each of the pixels 500 includes a photodiode 501 that performs photoelectric conversion, a circuit that transfers electric charge generated by the photodiode 501, and the like. The image sensor 50 may be provided with a plurality of pixels 500 arranged in one direction for each color of R, G, and B.

The analog processor 510 includes a plurality of programmable gain amplifiers (PGAs) 512 and a plurality of A/D converters 514, and amplifies an analog signal output from each of the pixels 500, converts the signal to a digital signal, and outputs the digital signal to the parallel-to-serial converter 520.

The parallel-to-serial converter 520 performs parallel-serial conversion on each digital signal output from the analog processor 510 and outputs the converted signal to the digital amplifier 522. The digital amplifier 522 amplifies the signal input from the parallel-to-serial converter 520 and outputs the amplified signal to the LVDS 524. The LVDS 524 converts the signal input from the digital amplifier 522 into a low-voltage differential serial signal, and outputs the converted signal to a subsequent step. The timing controller 530 controls the units constituting the image sensor 50.

Figure 21A:
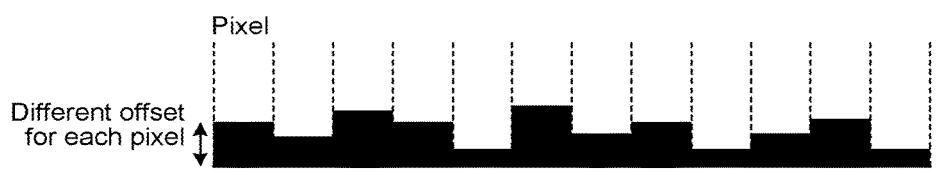
FIG. 21A is a diagram illustrating fixed pattern noise of the image sensor provided in the image reading device according to the comparative example.
Figure 21B:
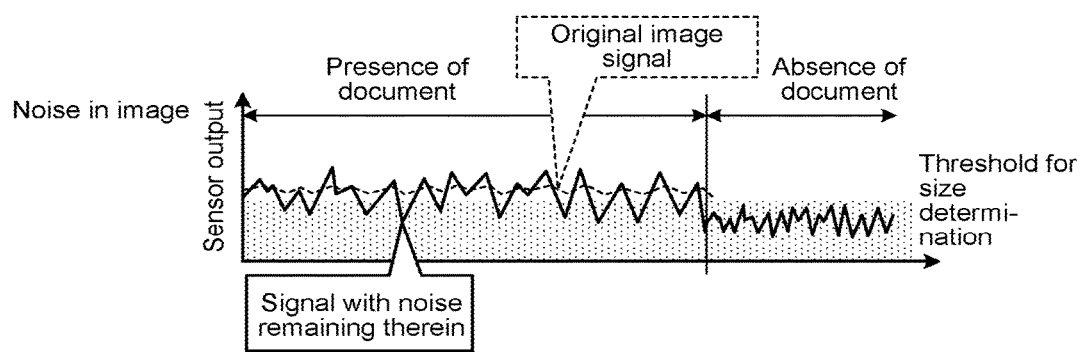
FIG. 21B is a diagram illustrating S/N of an image signal the image sensor provided in the image reading device according to the comparative example.

FIGS. 21A and 21B are diagrams illustrating CMOS-specific fixed pattern noise in the image sensor provided in the image reading device according to the comparative example and S/N of an image signal. As illustrated in FIG. 21A, the image sensor has fixed pattern noise with different offset for each pixel. When the fixed pattern noise is not corrected, as illustrated in FIG. 21B, the noise remains in the image signal, and determination accuracy using a threshold for determining the document size is thereby deteriorated.

Figure 22:
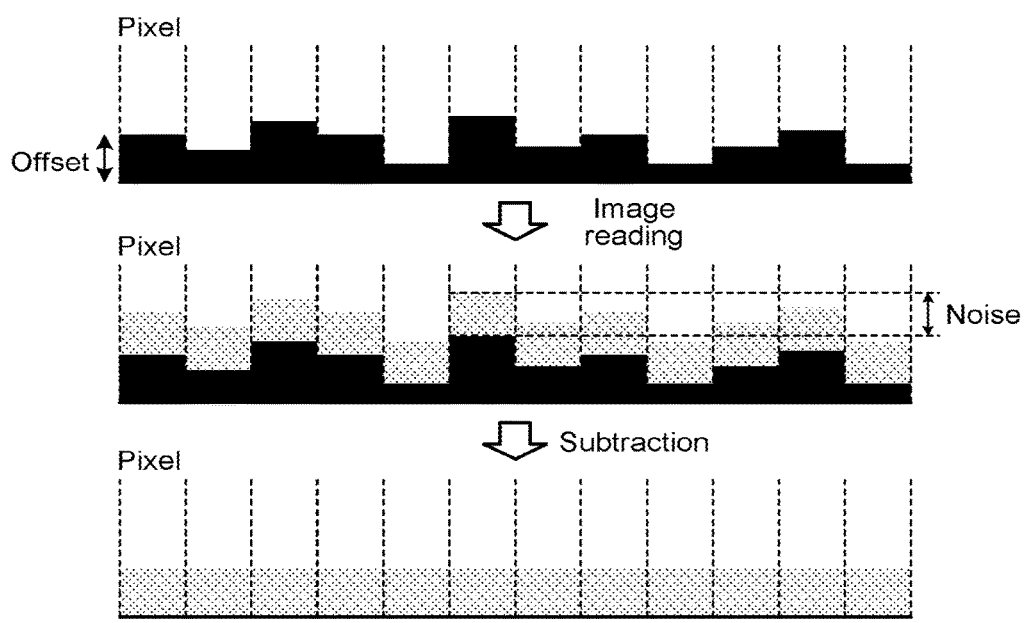
FIG. 22 is a diagram illustrating an operation example of a first correcting unit provided in the image reading device.

FIG. 22 is a diagram illustrating an operation example of the first correcting unit 610 provided in the image reading device 100. To reduce the fixed pattern noise specific to the CMOS image sensor, the first correcting unit 610 acquires a dark-time image in a light shielding state before image reading, stores the acquired image as black shading data (reference black level) for each pixel 500, and performs black shading correction for subtracting each of the black shading data from the image signal obtained by reading an image for each pixel 500.

Figure 23:
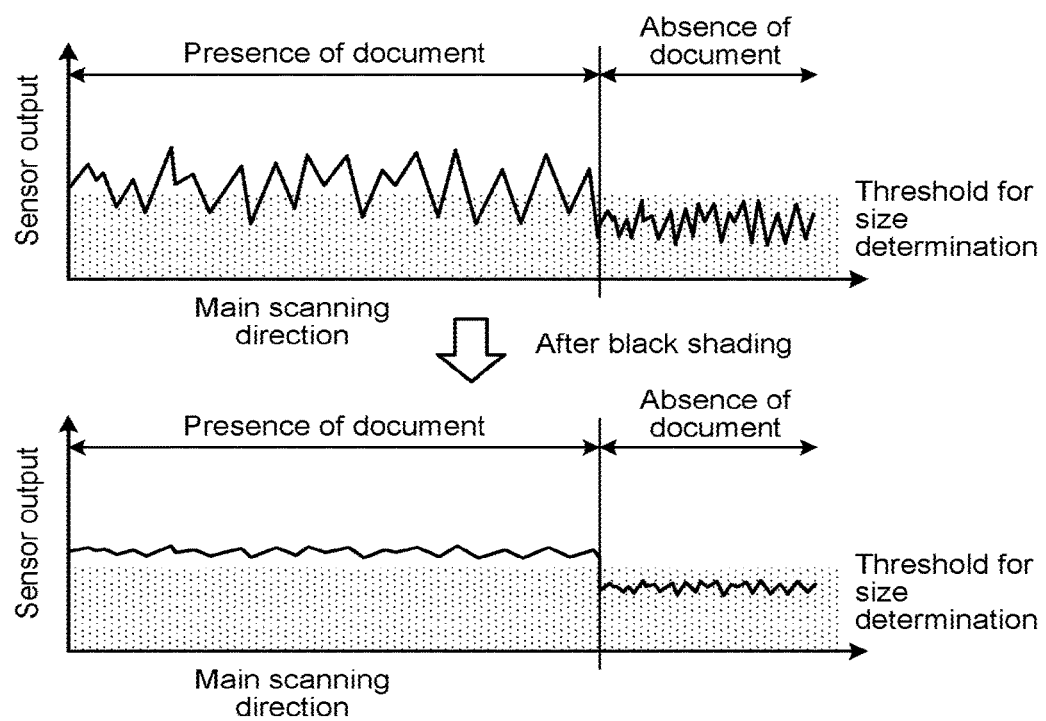
FIG. 23 is a diagram illustrating effects of reducing the fixed pattern noise due to black shading correction of the first correcting unit.

FIG. 23 is a diagram illustrating effects of reducing the fixed pattern noise due to black shading correction of the first correcting unit 610. The first correcting unit 610 performs black shading correction, so that the image reading device 100 can correct the offset difference for each pixel 500 due to the fixed pattern noise, and can therefore improve S/N of the image signal in determination of the document size as illustrated in FIG. 23.

According to exemplary embodiments of the present invention, it is possible to achieve a balance between reading a document at a high speed and reducing glare perceived by the user when determining a document size while preventing erroneous determination of the document size.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory, semiconductor memory, read-only-memory (ROM), etc. Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. An image reading device configured to determine a document size and perform image reading according to a result obtained when an image sensor performs photoelectric conversion for each pixel on a reflected light of light with which a light source irradiates the document, comprising:
a controller configured to perform control, when the document size is to be determined, so as to reduce a light amount irradiated by the light source more than that in a case of image reading; and
circuitry configured to
extend, when the document size is to be determined, a period in which the image sensor performs photoelectric conversion in a main scanning direction longer than that in a case of image reading;
average, when the document size is to be determined, results obtained when the image sensor performs photoelectric conversion for a plurality of predetermined pixels; and
determine the document size according to the average in the extended period.

2. The image reading device according to claim 1, wherein
the circuitry is configured to extend a period for performing photoelectric conversion so that the photoelectric conversion of the image sensor is not saturated even if an ambient light of a predetermined light amount is incident on the image sensor.

3. The image reading device according to claim 1, wherein the circuitry is further configured to
perform black shading correction using dark-time black shading data of the image sensor, and
average the results obtained when the image sensor performs photoelectric conversion for the pixels based on the result obtained when the circuitry performs the black shading correction.

4. The image reading device according to claim 3, wherein
the circuitry is configured to perform black shading correction using dark-time black shading data acquired before determination of the document size.

5. The image reading device according to claim 3, wherein
the circuitry is configured to perform black shading correction using the dark-time black shading data acquired in the extended period.

6. The image reading device according to claim 1, wherein the light source is configured to be divided into a plurality of blocks whose lighting and extinguishment can be independently controlled respectively, and when the document size is to be determined, the controller is configured to control so as to extinguish the block unnecessary for determination of the document size.

7. The image reading device according to claim 1, wherein the circuitry is further configured to perform white shading correction using white shading data which is a result obtained when the image sensor performs photoelectric conversion for each pixel on a reflected light of light with which the light source irradiates a white reference member, and average the results obtained when the image sensor performs photoelectric conversion for the pixels based on the result obtained when the circuitry performs the white shading correction.

8. The image reading device according to claim 7, wherein the circuitry is configured to perform white shading correction using the white shading data acquired before the document size is determined.

9. An image reading method to determine a document size and perform image reading according to a result obtained when an image sensor performs photoelectric conversion for each pixel on a reflected light of light with which a light source irradiates the document, comprising:

performing control, when the document size is to be determined, so as to reduce a light amount irradiated by the light source more than that in a case of image reading;

extending, when the document size is to be determined, a period in which the image sensor performs photoelectric conversion in a main scanning direction longer than that in a case of image reading;

averaging, when the document size is to be determined, results obtained when the image sensor performs photoelectric conversion for a plurality of predetermined pixels; and determining, by a processor, the document size according to a result averaged by the averaging in a period extended by the extending.

10. The image reading method according to claim 9, wherein the extending extends a period for performing photoelectric conversion so that the photoelectric conversion of the image sensor is not saturated even if an ambient light of a predetermined light amount is incident on the image sensor.

11. The image reading method according to claim 9, further comprising:

performing black shading correction by using dark-time black shading data of the image sensor, wherein the averaging averages the results obtained when the image sensor performs photoelectric conversion for the pixels based on the result obtained when the performing black shading correction is executed.

12. The image reading method according to claim 11, wherein the performing black shading correction is executed by using dark-time black shading data acquired before determination of the document size.

13. The image reading method according to claim 11, wherein the performing black shading correction is executed by using the dark-time black shading data acquired in the period extended by the extending.

14. The image reading method according to claim 9, wherein the light source is configured to be divided into a plurality of blocks whose lighting and extinguishment can be independently controlled respectively, and when the document size is to be determined, the controlling is executed so as to extinguish the block unnecessary for determination of the document size.

15. The image reading method according to claim 9, further comprising:

performing white shading correction by using white shading data which is a result obtained when the image sensor performs photoelectric conversion for each pixel on a reflected light of light with which the light source irradiates a white reference member, wherein the averaging averages the results obtained when the image sensor performs photoelectric conversion for the pixels based on the result obtained when the performing white shading correction is executed.

16. The image reading method according to claim 15, wherein the performing white shading correction is executed by using the white shading data acquired before the document size is determined.

17. An image forming apparatus comprising:

an image reading device according to claim 1; and an image forming unit configured to form an image based on image data read by the image reading device.

18. A non-transitory computer-readable recording medium that contains a computer program that causes a computer to execute an image reading method that determines a document size and performs image reading according to a result obtained when an image sensor performs photoelectric conversion for each pixel on a reflected light of light with which a light source irradiates the document, the image reading method comprising:

performing control, when the document size is to be determined, so as to reduce a light amount irradiated by the light source more than that in a case of image reading;

extending, when the document size is to be determined, a period in which the image sensor performs photoelectric conversion in a main scanning direction longer than that in a case of image reading;

averaging, when the document size is to be determined, results obtained when the image sensor performs photoelectric conversion for a plurality of predetermined pixels; and determining the document size according to a result averaged by the averaging in a period extended by the extending.

* * * * *